United States Patent
Lepp et al.

(10) Patent No.: US 11,776,393 B2
(45) Date of Patent: Oct. 3, 2023

(54) METHOD AND SYSTEM FOR REVERSING THE DIRECTION OF A ROAD SEGMENT

(71) Applicant: BlackBerry Limited, Waterloo (CA)

(72) Inventors: James Randolph Winter Lepp, Ottawa (CA); Stephen McCann, Southampton (GB); Jeffrey Scott Dever, Kanata (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/581,144

(22) Filed: Jan. 21, 2022

(65) Prior Publication Data
US 2022/0148419 A1  May 12, 2022

Related U.S. Application Data

(63) Continuation of application No. 16/008,694, filed on Jun. 14, 2018, now Pat. No. 11,263,897.

(51) Int. Cl.
  *G08G 1/01* (2006.01)
  *H04W 4/40* (2018.01)
  *H04L 67/104* (2022.01)

(52) U.S. Cl.
  CPC .......... *G08G 1/0145* (2013.01); *H04L 67/104* (2013.01); *H04W 4/40* (2018.02)

(58) Field of Classification Search
  CPC .... G08G 1/0145; G08G 1/07; G01C 21/3658; H04L 67/104
  See application file for complete search history.

(56) References Cited

U.S. PATENT DOCUMENTS

| | | | |
|---|---|---|---|
| 9,013,325 B2* | 4/2015 | Miller | G08G 1/07 340/929 |
| 9,127,956 B2 | 9/2015 | Einecke | |
| 9,547,986 B1* | 1/2017 | Curlander | G08G 1/04 |
| 9,704,394 B2* | 7/2017 | Taylor | G08G 1/0125 |
| 9,811,786 B2 | 11/2017 | Small et al. | |
| 10,156,845 B1* | 12/2018 | Greenberger | G08G 1/096725 |
| 10,304,333 B2* | 5/2019 | Engel | H04W 4/029 |
| 10,309,789 B2* | 6/2019 | Ramasamy | G08G 1/0145 |
| 10,571,919 B2* | 2/2020 | VanBlon | B60K 35/00 |
| 10,607,481 B2* | 3/2020 | Dey | G08G 1/0145 |
| 11,030,889 B2* | 6/2021 | Kourous-Harrigan | H04W 4/40 |
| 2011/0193722 A1* | 8/2011 | Johnson | G08G 1/097 701/31.4 |

(Continued)

FOREIGN PATENT DOCUMENTS

WO  2017215365 A1  12/2017

OTHER PUBLICATIONS

US Department of Transportation, Federal Highway Administration, "Safety Evaluation of Installing Center Two-Way Left-Turn Lanes on Two-Lane Roads", Publication No. FHWA-HRT-08-042, Mar. 2008.

(Continued)

*Primary Examiner* — Ramsey Refai
(74) *Attorney, Agent, or Firm* — Moffat & Co

(57) ABSTRACT

A method at a computing device in an intelligent transportation system for reconfiguring a road segment, the method including receiving a request from a second computing device associated with a vehicle to change a configuration for the road segment; determining a road segment configuration; and reconfiguring the road segment based on the determined road segment configuration.

18 Claims, 7 Drawing Sheets

(56) References Cited

U.S. PATENT DOCUMENTS

| | | |
|---|---|---|
| 2011/0304476 A1 | 12/2011 | Johnson |
| 2015/0170310 A1* | 6/2015 | Amento ............... G06Q 20/145 705/13 |
| 2017/0132926 A1 | 5/2017 | Duale et al. |
| 2017/0148316 A1 | 5/2017 | Curlander et al. |
| 2017/0358025 A1 | 12/2017 | Varma et al. |

OTHER PUBLICATIONS

European Telecommunications Standards Institute, European Standard; ETSI EN 302 665: "Intelligent Transport Systems (ITS); Communications Architecture", No. V1.1.1, Sep. 2010.

Wikipedia, "Communications-based train control", accessed online, edited May 28, 2018.

Architecture Reference for Cooperative and Intelligent Transportation, Service Package; TM16: "Reversible Lane Management", last updated Jun. 6, 2018.

European Patent Office, Extended European Search report for application No. 19179808.1 dated Mar. 19, 2020.

European Patent Office, Partial European Search report for application No. 19179808.1 dated Oct. 29, 2019.

European Patent Office Office Action for Application No. 19179808.1-1009, dated Jul. 13, 2023.

* cited by examiner

METHOD AND SYSTEM FOR REVERSING THE DIRECTION OF A ROAD SEGMENT

FIELD OF THE DISCLOSURE

The present disclosure relates to traffic management, and in particular relates to traffic lane configuration.

BACKGROUND

The assignment of traffic into lanes is generally static and may last months or years. However, this use of static lanes creates inefficiencies in the utilization of road resources. Historically, it is quite costly to reconfigure lanes and roads, and the few solutions that exist to dynamically configure roads, including movable Jersey Barriers, complex lighting signals, among others, are expensive to deploy and operate, and thus are only provided in rare cases.

Human drivers require painted lines, digital or painted signs, and colored light signals. Human drivers can follow these painted lines, signs and signals, but become less attentive to changes when driving in the same area repeatedly. Autonomous vehicle driving systems more strictly adhere to signals that may change often.

Current systems are centrally controlled, and are generally either scheduled for big events such as sporting events, or set on a certain recurring daily schedule, for example based on commuting patterns. This allows for roads to adapt to certain long-term system needs, but does not allow for short-term response to the needs of vehicles.

BRIEF DESCRIPTION OF THE DRAWINGS

The present disclosure will be better understood with reference to the drawings, in which.

DETAILED DESCRIPTION OF THE DRAWINGS

Figure 1:
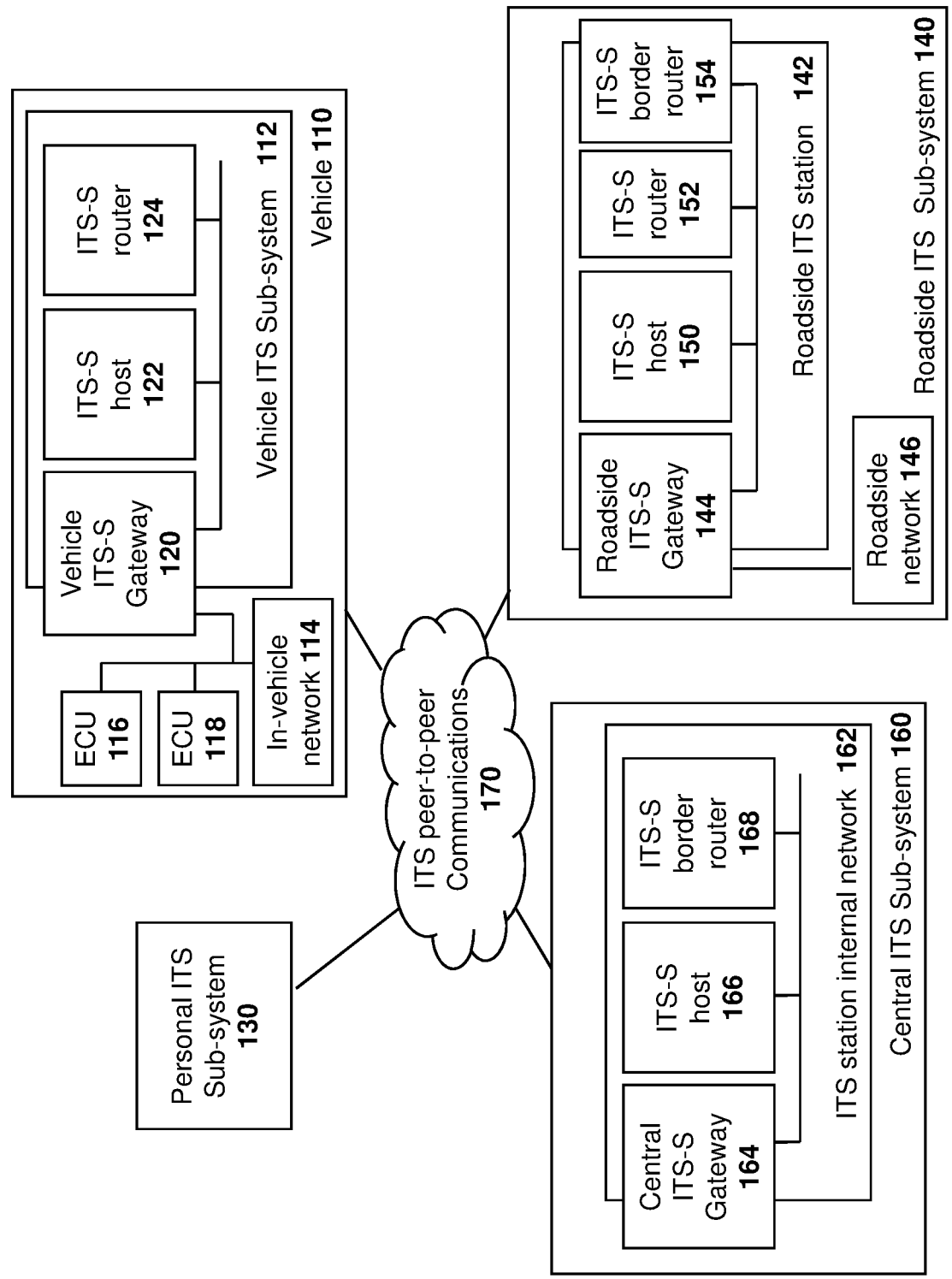
FIG. 1 is a block diagram of an intelligent transportation system.

The present disclosure provides a method at a computing device in an intelligent transportation system for reconfiguring a road segment, the method comprising: receiving a request from a second computing device associated with a vehicle to change a configuration for the road segment; determining a road segment configuration; and reconfiguring the road segment based on the determined road segment configuration.

The present disclosure further provides a computing device in an intelligent transportation system for reconfiguring a road segment, the computing device comprising: a processor; and a communications subsystem, wherein the computing device is configured to: receive a request from a second computing device associated with a vehicle to change a configuration for the road segment; determine a road segment configuration; and reconfigure the road segment based on the determined road segment configuration.

The present disclosure further provides a computer readable medium for storing instruction code, which, when executed by a processor of a computing device in an intelligent transportation system for reconfiguring a road segment, cause the computing device to: receive a request from a second computing device associated with a vehicle to change a configuration for the road segment; determine a road segment configuration; and reconfigure the road segment based on the determined road segment configuration.

Intelligent Transport Systems (ITS) are systems in which a plurality of devices communicate to allow for the transportation system to make better informed decisions with regard to transportation and traffic management, as well as allowing for safer and more coordinated decision-making. ITS components may be provided within vehicles, as part of the fixed infrastructure, such as on bridges or at intersections, and for other users of the transportation systems, including vulnerable road users such as pedestrians or bicyclists.

ITS deployment is receiving significant focus in many markets around the world, with radio frequency bands being allocated for the communications. In addition to the vehicle to vehicle communications for safety critical and non-critical applications, further enhancements to provide systems or applications are being developed for vehicle to infrastructure and vehicle to portable unit scenarios.

ITS software and communication systems are designed to enhance road safety and road traffic efficiency. Such systems include vehicle to/from vehicle (V2V) communications, vehicle to/from infrastructure (V2I) communications, vehicle to/from network (V2N) communications, and vehicle to/from pedestrian or portable unit (V2P) communications. The communications from a vehicle to/from any of the above may be generally referred to as V2X. Further, other elements may communicate with each other. Thus, systems may include portable to/from infrastructure (P2I) communications, infrastructure to infrastructure (I2I) communications, portable to portable (P2P) communications, among others.

Such communications allow the components of the transportation system to communicate with each other. For example, vehicles on a highway may communicate with each other, allowing a first vehicle to send a message to one or more other vehicles to indicate that it is braking, thereby allowing vehicles to follow each other more closely.

Communications may further allow for potential collision detection and/or avoidance, and allow a vehicle having a computing device that is part of the ITS to take action to avoid a collision, such as braking and/or steering, or accelerating and steering. Autonomous vehicle may use such communications. In other cases, an active safety system on a vehicle may take input from sensors such as cameras, radar, lidar, and V2X, and may act on them by steering or braking, overriding or augmenting the actions of the human driver. Another type of advanced driver assistance system (ADAS) is a passive safety system that provides warning signals to a human driver to take actions. Both active and passive safety systems may take input from V2X and ITSs.

In other cases, fixed infrastructure may give an alert to approaching vehicles that they are about to enter a dangerous intersection or alert vehicles to other vehicles or pedestrians approaching the intersection. This alert can include the state of signals at the intersection (signal phase and timing (SPaT)) as well as position of vehicles or pedestrians or hazards in the intersection. Other examples of ITS communications would be known to those skilled in the art.

Reference is now made to FIG. 1, which shows one example of an ITS station, as described in the European Telecommunications Standards Institute (ETSI) European Standard (EN) 302665, "Intelligent Transport Systems (ITS); communications architecture", as for example provided for in version 1.1.1, September 2010.

In the embodiment of FIG. 1, a vehicle 110 includes a vehicle ITS sub-system 112. Vehicle ITS sub-system 112 may, in some cases, communicate with an in-vehicle network 114. The in-vehicle network 114 may receive inputs from various electronic control unit (ECUs) 116 or 118 in the environment of FIG. 1.

Vehicle ITS sub-system 112 may include a vehicle ITS Station (ITS-S) gateway 120 which provides functionality to connect to the in-vehicle network 114.

Vehicle ITS sub-system 112 may further have an ITS-S host 122 which contains ITS applications and functionality needed for such ITS applications.

Further, an ITS-S router 124 provides the functionality to interconnect different ITS protocol stacks, for example at layer 3. The ITS-S router 124 may be capable of converting protocols, for example for the ITS-S host 122.

Further, the ITS of FIG. 1 may include a personal ITS sub-system 130, which may provide application and communication functionalities of ITS communications (ITSC) in handheld or portable devices, such as personal digital assistants (PDAs), mobile phones, user equipment, among other such devices.

A further component of the ITS shown in the example of FIG. 1 includes a roadside ITS sub-system 140, which may contain roadside ITS stations and interceptors such as on bridges, traffic lights, among other options.

The roadside sub-system 140 includes a roadside ITS station 142 which includes a roadside ITS-S gateway 144. Such gateway may connect the roadside ITS station 142 with proprietary roadside networks 146.

A roadside ITS station may further include an ITS-S host 150 which contains ITS-S applications and the functionalities needed for such applications.

The roadside ITS station 142 may further include an ITS-S router 152, which provides the interconnection of different ITS protocol stacks, for example at layer 3.

The ITS station 142 may further include an ITS-S border router 154, which may provide for the interconnection of two protocol stacks, but in this case with an external network.

A further component of the ITS in the example of FIG. 1 includes a central ITS sub-system 160 which includes a central ITS station internal network 162.

Central ITS station internal network 162 includes a central ITS-S gateway 164, a central ITS-S host 166 and a ITS-S border router 168. ITS-S gateway 164, central ITS-S host 166 and ITS-S border router 168 have similar functionality to the gateway 144, ITS-S host 150 and ITS-S border router 154 of the roadside ITS station 142.

Communications between the various components may occur through a ITS peer-to-peer communications network 170.

The system of FIG. 1 is however merely one example of an ITS.

From FIG. 1 above, V2X communications may be used for road safety, for improving efficiency of road transportation, including movement of vehicles, reduced fuel consumption, among other factors, or for other information exchange.

V2X messages that are defined by the European Telecommunications Standards Institute (ETSI) fall into two categories, namely Cooperative Awareness Message (CAM) ($1^{st}$ message set) and Decentralized Environmental Notification Message (DENM) ($2^{nd}$ message set). A CAM message is a periodic, time triggered message which may provide status information to neighboring ITS stations. The broadcast is typically transported over a single hop and the status information may include one or more of a station type, position, speed, heading, among other options. Optional fields in a CAM message may include one or more of information to indicate whether the ITS station is associated with roadworks, rescue vehicles, or a vehicle transporting dangerous goods, among other such information.

Typically, a CAM message is transmitted between 1 and 10 times per second.

A DENM message is an event triggered message that is sent only when a trigger condition is met. For example, such trigger may be a road hazard or an abnormal traffic condition. A DENM message is broadcast to an assigned relevance area via geo-networking. It may be transported over several wireless hops and event information may include one or more of details about the causing event, detection time, event position, event speed, heading, among other factors. DENM messages may be sent, for example, up to 20 times per second over a duration of several seconds.

Similar concepts apply to the Dedicated Short Range Communications (DSRC)/Wireless Access In Vehicular Environments (WAVE) system in which a Basic Safety Message (BSM) is specified instead of, or in addition to, the CAM/DENM messaging.

Autonomous Driving

Current autonomous driving systems use a high-resolution map of a region within which the vehicle can navigate. Maps can be pre-loaded in the memory of a computing device associated with a vehicle, or downloaded as the vehicle is in motion. There are situations where maps are simply not available and other cases where specific limitations on road use are not needed.

Additional sensors are used as input to software that controls the accelerator, steering and braking. One of these inputs may be from V2X communication systems. Two types of V2X messages currently standardized and deployed in pilots are SPaT and the Mobile Application Part (MAP) messages. The former provides information on the state of movement in an intersection and the latter provides lane level topological definition of lanes.

Reconfigurable Lanes

Various options exist for reconfiguring lanes. In some cases, movable Jersey Barriers may be deployed on roadways. These barriers provide a physical structure between opposing traffic lanes. The physical barrier may be moved to increase the number of lanes in a first direction while simultaneously decreasing the number of lanes in a different direction. Such barriers are expensive to deploy and expensive to operate. In particular, specialized machinery is required to move such barriers, which may need to be done every day during weekdays. Further, weather conditions may prevent these physical systems from being used in some climates.

In other cases, lighting or lane indicators may be provided as part of the roadway infrastructure. For example, consider the case of road lanes over a bridge. Bridges are expensive to build, so the utilization of lanes is at a premium. In many cases, there are times when the middle lane may be changed from one direction to another in order to handle the typical inflow and outflow of vehicles during the morning and afternoon rush hours.

The timing of the specific road use is centrally controlled, and done according to an expectation of use. Drivers are typically notified of the current direction of the shared lane utilizing a traffic light system. For example, reference is now made to FIG. 2A. in the embodiment of FIG. 2A, a roadway consists of three lanes, namely lane 210, lane 212 and lane 214.

Figure 2B:
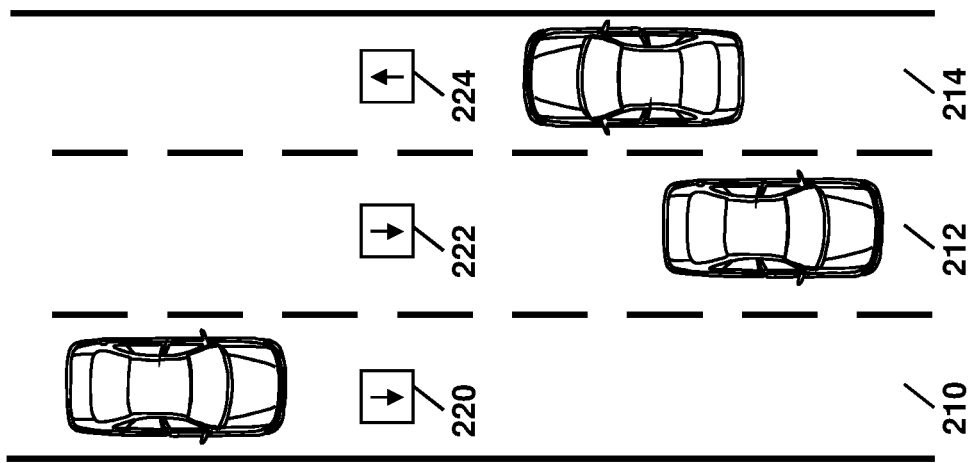
FIG. 2B is a schematic diagram of the road of FIG. 2A in which the center lane is reconfigured to a second direction of travel.
Figure 2A:
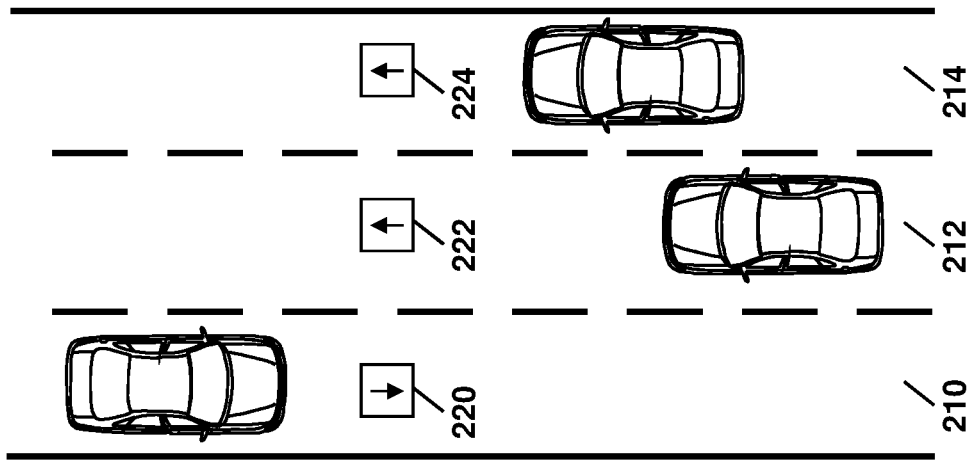
FIG. 2A is a schematic diagram of a road in which the center lane is configured for a first direction of travel.

In the example of FIG. 2A, the lanes may be reconfigurable and signaling indicators such as indicators 220, 222 and 224 may inform drivers of the currently configured direction for a particular lane. Specifically, indicators 220, 222 and 224 may show a green light if the lane is allowed to be used for vehicles travelling in a first direction and a red light if the lane cannot be used for vehicles in that same direction. A driver approaching from the opposite direction would see a green light in the lane that has a red light from the first direction.

Rather than, or in addition to, the colors of lights, in some cases shapes may be used. For example, a red X may be used to indicate that the lane should not be used for vehicles travelling in a first direction whereas a green arrow may indicate that users are allowed to use such lane.

Other examples of lane markers would be known to those skilled in the art.

Referring to FIG. 2B, the center lane 212 has its direction changed at some point during the day when compared to the embodiment of FIG. 2A. In this case, indicator 222 now allows traffic in the opposite direction from the embodiment of FIG. 2A.

However, it may be expensive to deploy and maintain such lighting systems. The system may further be subject to human error, especially when drivers are used to driving in a certain lane.

Two Way Left Turn Lane

The two-way left turn lane (TWLTL) is a painted lane that allows left turning vehicles driving in either direction to share a single lane. The sharing is done by drivers visually seeing each other and avoiding crashing. The use of such lane is possible because cars turning left slow down to a low speed and only are in the lane for a short distance. One shortcoming of this type of lane is that the lane is limited to low speed and each vehicle can only use if for a short distance. Such lane therefore becomes an inefficient use of space.

As will be appreciated by those in the art, similar concepts apply to two-way right turn lanes when right-hand drive vehicles are used.

Dynamic Lane Reconfiguration

In accordance with the embodiments described below, roads are split into road segments and, in various embodiments, a vehicle may request a road segment or part of a road segment. Further, in some cases, voting may be done to dynamically reconfigure roadways.

Figure 3:
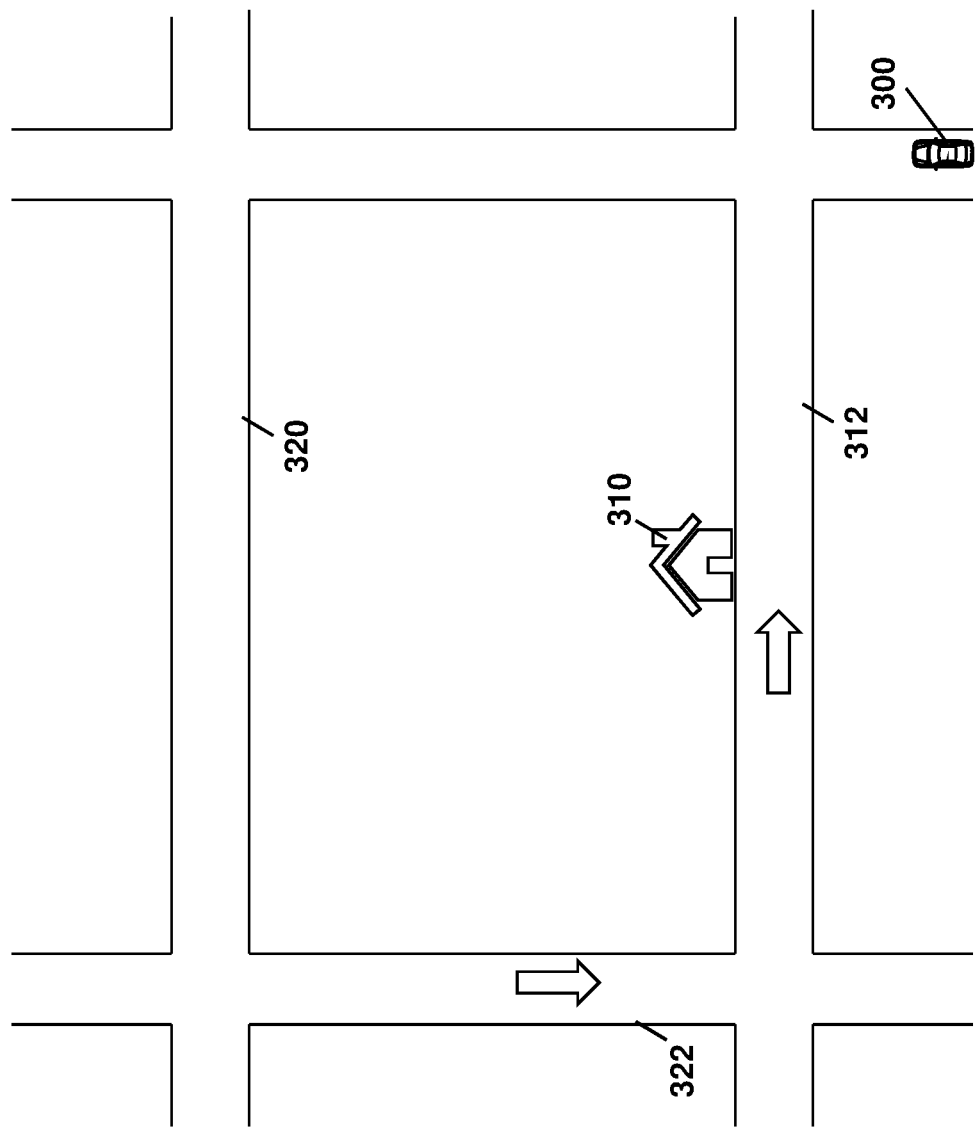
FIG. 3 is a schematic diagram of a region having various road segments, where each road segment may have a static or dynamic direction of travel.

For example, one use case for such technology is the reconfiguration of a one-way street. For example, consider the case where it is 3 a.m. and there is no one on the road and the road is configured as in the example of FIG. 3. Specifically, the address that an ITS user 300 is attempting to get to is shown as building 310. Building 310 is on a one-way street 312 configured to flow in the opposite direction that ITS user 300 needs to go.

In this case, under typical circumstances, the ITS user 300 would travel to road 320 in order to get to road 322, and then back to road 312 in order to get to address 310.

However, if there are no other users on the road in the opposite direction, greater efficiency can be realized by allowing the direction of road 312 to be changed, rather than the direction remaining fixed. In this case, the vehicle could request and acquire road 312 for the desired direction for a time period, which would allow vehicle 312 to proceed directly onto road 312 in order to access building 310, thereby saving time and resources.

Therefore, in accordance with some embodiments described below, in the event that only one vehicle is on or approaching a particular road segment, the vehicle can request the direction of that road segment be set. Either the infrastructure or a vehicle, through V2X communications, is configured to communicate with other vehicles that may be entering or approaching the same road segment. This communication allows other vehicles to be informed that the road segment has a set direction for a particular time period. The communication prevents other vehicles from using that particular lane or road segment for travelling in the opposite direction relative to the vehicle that has requested and acquired that particular lane or road segment.

In the event that many vehicles request use of the particular road segment, a type of voting system may be used to assign the road segment. The assignment can depend on the goal for the road segment. For example, voting may allow for higher system efficiency (if that is the goal of the ITS). However, in other cases, rather than the most efficient system, other goals may include the prioritization of movement for buses or emergency vehicles. In other cases, the prioritization may be done to maximize revenue. For example, if users pay a toll to utilize road segments, users willing to bid more for a road segment may obtain the road segment. Other examples of goals are possible.

An assignment of a road segment direction may be for a long time, but may also be a for a short time. For example, the time may be as short as it takes for one vehicle to transit the assigned segment. Specifically, the electronic means of assigning and reassigning the road segment described in the embodiments herein allows for faster switching of the direction of that road segment.

An override of the local dynamic switching of lanes by a central traffic controller is also possible. As such, the individual road segments may run in three modes of operation. In a first mode of operation, each lane and segment may be controlled individually. In a second mode of operation the road segment may be controlled and coordinated with neighboring segments and intersections. In a third embodiment, the road segment may be controlled from a central controller.

In the embodiments described herein, a road network is split into road segments. Segments may include intersections, or intersections may be considered to be their own segment. Segments may be of various different shapes and sizes and the division into segments allows for allocation of resources in an efficient way.

Individual road segments that may have one, two or more lanes. Some lanes may have a dedicated direction. Further, none, some, or all lanes may have a reconfigurable direction. This includes assigning turning lanes and driving lanes.

Intersections and lanes through intersections may also be reconfigurable. For example, an intersection may be reconfigurable to allow for one, or two, or more left turning lanes or even disallowing left turning lanes at all. The assignment may be time limited.

Access into an intersection or reconfigurable lane may be controlled or monitored.

Vehicles exiting the intersection or exiting a road segment may also be monitored. The control and monitoring can be done by V2X communication or infrastructure sensors such as cameras, among other options.

A road segment can be used by more than one vehicle at a time. The segment system as described herein is thus intended to assign lane directionality to one or more potential vehicles.

In some cases, lane assignment and spacing are also included in the embodiments disclosed herein.

Requesting Lane Reconfiguration

In accordance with one embodiment of the present disclosure, a computing device or onboard unit (OBU) on a vehicle can send a request to road infrastructure indicating that the vehicle requires road resources. For example, the request may be made to any network based server or computing device, including the central ITS sub-system 160 from FIG. 1. The request may be sent to a road side unit (RSU) or via V2X network (e.g. cellular-V2X) to the network based server or computing device, among other options.

The request for resources can be an explicit request or an implicit request. An explicit request is one in which a vehicle requests a specific lane in a specific segment of road in a specific direction. Thus, the vehicle expressly requests a road resource.

An implicit request is one in which the vehicle requests a route from a first point to the second point, and the ITS determines that certain road segments should be used. The ITS assigns these road segments to the vehicle, potentially reconfiguring lanes as required.

A request may be for a current time, or may be for a future time. Further, the request may have a duration.

A grant of a resource could be instantaneous for a single car, or persist for more than one vehicle, and the granting could be provided by an RSU, a central traffic controller, or some other entity.

Various vehicles may have different priorities over other vehicles. For example, emergency vehicle may have a higher priority and be given more weight when making a lane reconfiguration decision than other vehicles.

Resources may be updated by a road segment traffic service, as described below, dynamically. In one use case, lanes may be blocked. For example, in emergency situations, such as when a disabled vehicle or accident blocks a lane, V2X messages may be sent utilizing existing V2X messaging for safety. Other examples of messaging to a road segment traffic service may however also be used.

A road segment traffic service may note the lane being blocked and lane reconfiguration, as described herein, may be used to reroute traffic around the blocked lane. The road segment traffic service may be a logical component of any network node and may provide control and traffic management on the local roadway. In this example, as well as the examples described below, a logical component may comprise software that is executed by one or more processors of hardware components in the network. A network node may be part of the local Roadside ITS Sub-system 140 or part of the Central ITS Sub-system 160 shown in FIG. 1. The software may be executed in the cloud, in a virtual machine, for example.

A V2X message may signal the reconfigured lanes to the vehicle from the road segment traffic service after the infrastructure receives reports of the blocked lane. The V2X message from the infrastructure to the vehicle may be sent through an RSU to the vehicle, or may be sent via cellular V2X, among other options.

Further, V2X messages from an emergency vehicle may be used to reconfigure lanes as well.

Figure 4:
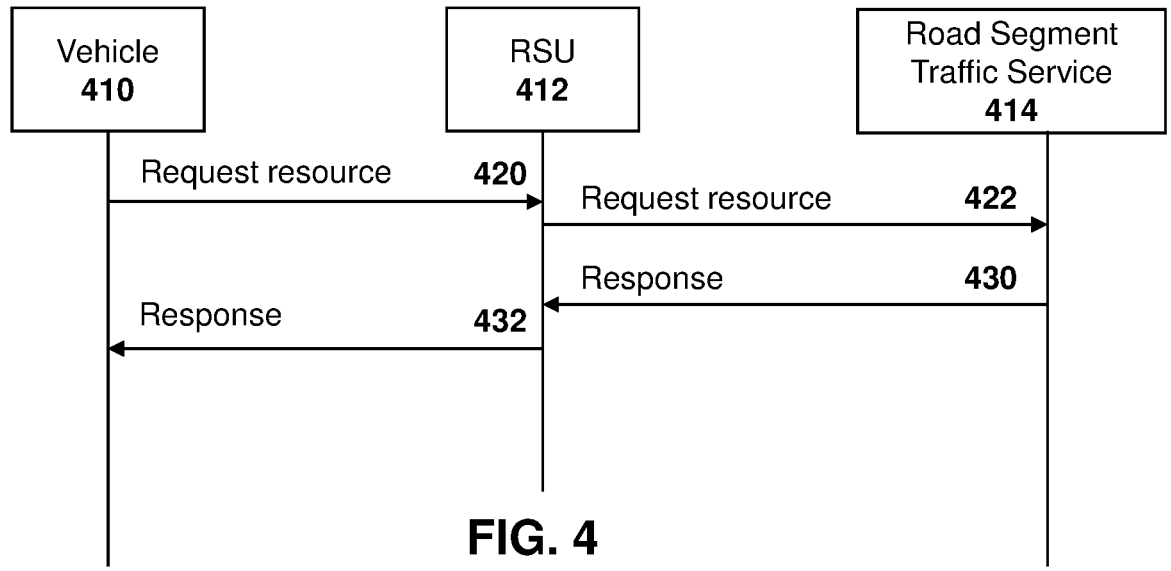
FIG. 4 is a dataflow diagram showing communication from a computing device on a vehicle to request road resources.

For example, reference is now made to FIG. 4, which shows a vehicle 410 requesting resources through an RSU 412. As will be appreciated by those skilled in the art, a request may instead be made through a V2X message, rather than through an RSU 412, in some cases.

As a first step, vehicle 410 requests a resource, as shown with message 420. For example, message 420 may indicate that a vehicle wishes to obtain access to road segment 312 from FIG. 3, and the direction of travel desired. Other options of resource requests, as for example described above, are possible.

RSU 412 processes request 420 and forwards the request as message 422 to a road segment traffic service 414. Road segment traffic service 414 node may be part of the local Roadside ITS Sub-system 140 or part of the Central ITS Sub-system 160 shown in FIG. 1.

The road segment traffic service 414 may consider the request and either grant the request, deny the request, or propose alternatives to the request. In each case, a response 430 is provided back to RSU 412. If the road segment traffic service 414 does not respond, this may indicate a system fault, in which case the vehicle is not provided with a response and the vehicle may consider the request to be denied, for example.

If a response is received, the RSU 412 may then provide the response back to the vehicle 410, as shown with message 432. If the road segment traffic service 414 does not respond, this may indicate a system fault, in which case the vehicle may consider the request to be denied, for example.

Based on message 432, if the resource is granted then the vehicle 410 is permitted to use the requested road resources.

Voting and Volume-Based Dynamic Reconfiguration

In a further embodiment, many vehicles may be on a road or road segment. As the volume of vehicles changes in each direction, a reconfiguration of the lanes based on voting may occur.

Figure 5:
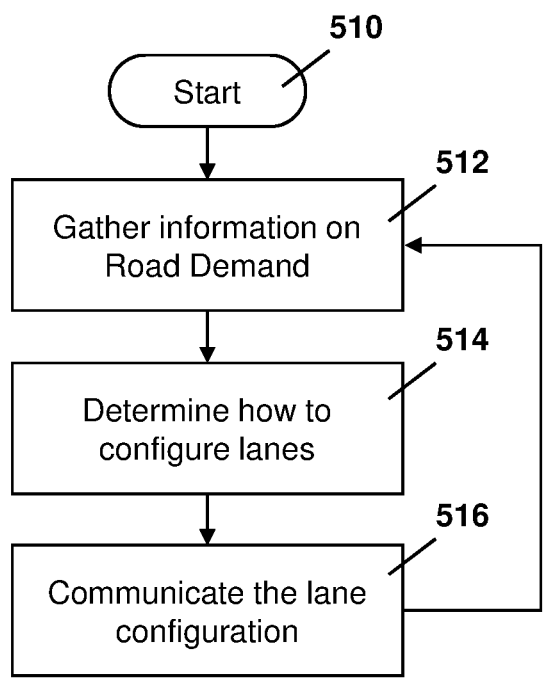
FIG. 5 is a process diagram showing the gathering of information to reconfigure road resources.

In particular, reference is now made to FIG. 5, which shows a process performed in a road infrastructure. The process may be distributed in roadside equipment at each road segment, or may be centralized at a traffic operations center.

The process of FIG. 5 starts at block 510 and proceeds to block 512 in which the road infrastructure gathers information on current road demand, i.e. volume of vehicles travelling in each direction. The gathering of information at block 512 may occur in various ways. In a first embodiment, sensors on a road may count traffic at various locations on the road segments. This may be at ingress or egress points of the road segment, or may be based on information from neighboring segments to account for vehicles that will soon enter the road segment for which the information is being gathered.

In a second case, vehicle radio communication to the infrastructure, which may involve standard V2X messaging (e.g. monitoring periodic basic safety messages) or the sending of a request for use of a road segment, may be counted towards information on current road demand.

In a third case, block 512 may use a route planning information from vehicles, when the vehicles inform the infrastructure of their destination or full path. In this case, the route planning system may be used to communicate current or future demand.

Once information is gathered, the process proceeds from block 512 to block 514, in which the road infrastructure determines how to configure the road segment or lanes in the road segment. This may take into account the determined demand from block 512 and the goals of the algorithm for road use. As described above, goals may include best overall efficiency, optimized travel time for higher priority vehicles, optimized revenue, among other options. Further, prioritization may occur based on first to request, or first to enter the segment, among other options.

For example, if the road segment is an intersection, the intersection may assign rights based on traffic volume. In one case, two vehicles may proceed from a first direction in a four way stop intersection before another vehicle from a different direction is allowed to proceed. This could allow for more vehicle throughput if vehicles are arriving from a first direction at a higher volume than from a second direction, evening the wait time at the intersection.

In another example, multiple lanes could be configured to be left turn lanes for a period of time, while at other times only one or no left turn lanes are assigned.

Other examples are possible.

Once the determination is made at block 514, the process proceeds to block 516 in which the road infrastructure communicates to vehicles the road configuration. This may be done in several ways.

In a first case, radio communication to vehicles may be used to send the configuration. An RSU may broadcast lane configurations for example. This may include a timer value for how long the configuration will remain before a possible change.

In a second case, the infrastructure may modify lights and digital signage if physical infrastructure components exist.

In a third case, a mixture of lights and digital signage, along with radio communications, may be done to account for non-radio equipped vehicles.

After the communication at block 516, the process may proceed back to block 512. However, in some cases, this proceeding back to block 512 may be delayed for a designated time period. For example, the timer value may be communicated indicating how long the current configuration will remain. This stability or persistence of the configuration may be in the order of seconds, minutes or hours but is communicated so that vehicles using the road segments are informed if they can safely use the lane. When the timer expires, a short buffer period may be used to clear the lane before the lane may be reconfigured. This buffer period may be built into the timer that is communicated.

As will be appreciated by those skilled in the art, the buffer period is long enough to clear the lane but typically would be relatively short in order to provide for efficiency of the road system. Sensors may also be used to verify the road segment and can be reconfigured during or after the buffer period expires.

The lane may also be renewed with the current configuration after the time period expires, and this renewal may be communicated before the timer expires.

Mixed Environments

In order to account for situations in which not all vehicles are able to receive V2X communications, various embodiments below are provided. These embodiments account for a mixture of radio and non-radio vehicles.

In a first embodiment, a set of lanes exist. Some are dedicated in a first direction or a second direction, but another set of lanes may be reconfigurable and access to these is only given to V2X capable vehicles that have been explicitly granted access by the infrastructure. Thus, the system works like an admission control system and in the event of the failure of communications there will be no access to the lane. Fail safes in the infrastructure ensure that colliding paths are not assigned and communicated to ITS components.

In a further embodiment, block 514 in FIG. 5 may take into account whether there is a mixture of V2X capable vehicles and non-V2X capable vehicles on or intending to use the road segment, or whether only V2X capable vehicles are requesting use of the road segment.

The reconfiguration or override of the default traffic direction or lane configuration may depend on whether or not only V2X vehicles are present in the road segment. For example, reconfiguration may only be allowed once sensors confirm that there is a pure V2X environment. Thus, the infrastructure detects when a non-V2X vehicle is present, and can make decisions based on this detection.

When non-V2X vehicles exist on the roads, sensors and signaling may be needed to monitor and provide access to reconfigurable lanes and intersections to non-V2X and non-automated vehicles.

Multiple Route Planning and Negotiation

The example of FIG. 5 above involves an interaction between a vehicle and either a single road segment, or a single road segment plus its neighbors. In accordance with a further embodiment of the present disclosure, an aspect of planning for an entire route across multiple segments and intersections is provided.

Specifically, in an area where single-lane roads or multi-lane one way streets exist, there are multiple possible routes to get to a destination. In this regard, for route planning purposes and road allocation, a vehicle may send a request to a road infrastructure component, and the road infrastructure may reply with a route. The route provided may involve possibly reconfiguring a direction of one or more streets for the route to the requested destination.

Figure 6:
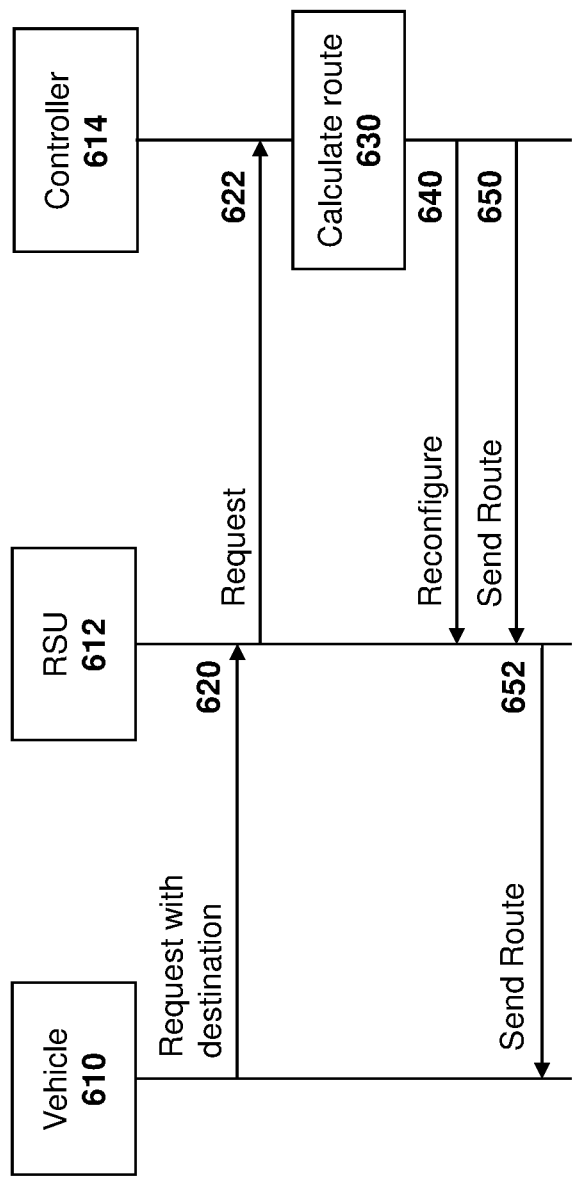
FIG. 6 is a dataflow diagram showing the assignment of road resources based on a vehicle destination.

Reference is made to FIG. 6, which shows an example dataflow for route planning and resource allocation wherein optimization can be achieved by reconfiguring lanes.

In particular, as seen in FIG. 6, a vehicle 610 communicates with an RSU 612. Further a controller 614 may be any infrastructure component which may be used to reconfigure lanes. In some embodiments, the controller may be collocated with RSU 612. In other embodiments, controller 614 may be any network element remote from RSU 612.

Vehicle 610 sends message 620 to RSU 612. The message 620 includes a current location and a destination or waypoint. Optionally, message 620 may include an expected time for travel.

The infrastructure or RSU 612 forwards the request as message 622 to controller 614.

Controller 614 calculates a route for vehicle 610, as shown by block 630, which may or may not include reversing the direction of one or more road segments. The calculation of the route may be based on goals, such as shortest travel time, shortest distance, least expensive with regard to tolls, among other options. The route planning may in some embodiments consider routes already planned for other vehicles or congestion rates on road segments. In some embodiments, the route planning may allow bidding for faster passage of vehicles. Other options for route planning are possible.

The infrastructure component or the controller 614 may send one or more messages 640 to one or more RSUs 612 to reconfigure road segments. Message 640 may optionally include a time for the configuration of the road segment. In this way the route can be planned and the resources allocated for when the vehicle will reach the road segment.

Again, the reconfiguration of the road segment may be based on a variety of factors. For example, the reconfiguration may be based on one or more of best overall efficiency, optimized travel time for higher priority vehicles, optimized revenue, first to request, or first to enter the segment among, other options.

Further, controller 614 may send a message 650 which provides a route for the vehicle to the RSU 612 currently interacting with vehicle 610, which may then forward the route to the vehicle as message 652. In other cases, controller 614 may provide the route to the vehicle directly using V2X or cellular network, for example.

In the example of FIG. 6, the infrastructure does most of the work. The vehicle sends requests and receives responses.

The processes of FIG. 5 and FIG. 6 may utilize central decision-making, for example at a regional operations center, or may use distributed decision making, or a combination of the two in various embodiments.

Infrastructure Less Systems

The embodiments above involve a vehicle sending requests to infrastructure, whether local or centralized. In accordance with a further embodiment of the present disclosure, two vehicles may negotiate the use of a road segment, in some cases without any infrastructure component. This can avoid the high cost of deploying infrastructure.

One use example of such direct negotiation would be for shared left turn lanes or shared right turn lanes, among other shared multidirectional lanes, where radio communication could augment visual cues.

Figure 7:
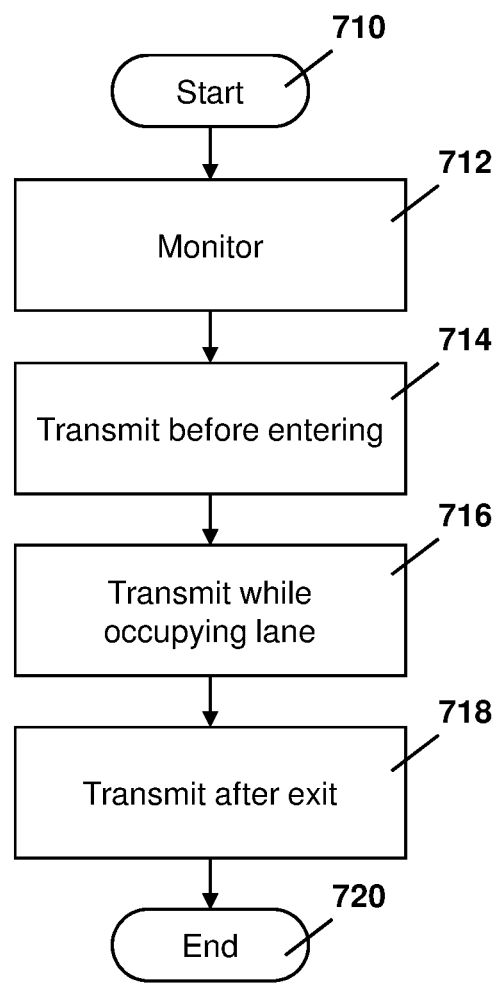
FIG. 7 is a process diagram showing communication from a vehicle before, during, and after using a road segment.

Reference is now made to FIG. 7, which illustrates an example of a vehicle that needs to use a two way left turn lane.

The process of FIG. 7 starts at block 710 and proceeds to block 712 in which a computing device on the vehicle may monitor a radio channel for other vehicle messages. If the computing device in the vehicle receives messages indicating that another vehicle is already in the two way left turn lane, the computing device on the vehicle may determine whether the other vehicle's position and trajectory conflicts with the vehicle's planned route. In this case, it may use the received message to determine whether to enter or proceed down the two-way left turn lane or not. Two-way left turn lanes may provide for multiple sequential left turns, and may be divided into corresponding segments. In other countries, the lanes may be referred to as two-way right turn lanes.

The monitoring step 712 may involve monitoring other sensors in addition to V2X radio communication.

After a period of time receiving no messages from other vehicles or when all receive messages indicate there is not a vehicle on a collision course in the two way left turn lane, the process proceeds to block 714.

At block 714, the computing device on the vehicle may transmit a message indicating it intends to use the lane. This may include one or more of the location of entry, location of exit, speed, heading, time of entry, duration, among other information. Such information is optional and in other cases a subset of the information above may be provided.

The message at block 714 may be sent a certain time ahead of when the vehicle will actually need to steer into the lane. This may be a fixed time interval ahead of the merge into the lane, for example. In some cases the projected time of entry into the lane may be indicated in the message.

From block 714 the process proceeds to block 716 in which the vehicle may send periodic messages while occupying in the lane. This indicates to another vehicle the presence of the vehicle in the lane as well as predictions or intentions on the vehicle's next move, such as exiting the lane.

The process then proceeds to block 718 in which a computing device on the vehicle sends a message once the vehicle has as exited the lane, indicating that the vehicle is now clear of the lane.

The process then proceeds to block 720 and ends.

The messages for the embodiment of FIG. 7 may be CAM or BSM messages with additional fields to indicate a left turn lane operation. There may be different message types for the message is sent at blocks 714, 716 and 718, or they may be of the same message type with different content values.

While a two-way left turn lane was used as an illustrative example for FIG. 7, the process can be used for any lane, road segment or intersection.

Another example may use the process to control the flow of traffic through a 4-way stop. Such control may take into account the volume of traffic and may allow for the multiple vehicles travelling in one direction to be allocated the road resource or segment for traveling in that direction before allowing a vehicle travelling in another direction to be allocated the road resource or segment.

All the steps of FIG. 7 allow a vehicle to be monitoring for messages from other vehicles. Received message contents may then be used to make decisions about steering, breaking or accelerating the vehicle. Received message contents may be combined or compared with other input from sensors such as cameras, lidar and radar. As such, the sensors may be used as the primary observation of the vehicle's surroundings and the received message is layered on top as trajectory and path intent data for the observed other vehicles.

Message Formats

The assignment of reversible lane direction may be covered by messages similar to existing MAP and SPaT messages. These current messages may need to be extended to account for road segment assignments not necessarily being as cyclical as intersection signaling. Specifically, road assignments may not occur at regular periods, contrary to intersection signaling.

Examples of request messages from vehicles may be provided as a new class of V2X messages and may be, for example, provided in Tables 1, 2 and 3 below.

TABLE 1

Path Request Message

Path Request Message - V2I message from vehicle to infrastructure
Source Location (address, GNSS coordinates)
Destination or Waypoint Location (address, GNSS coordinates)
Departure Time ("now" is an option)
Vehicle Priority Table 1 therefore shows example fields in a Path request message.

TABLE 2

Road Segment Request Message

Road Segment Request Message - V2I message from vehicle to infrastructure
MAP information about what road segment and lane is requested TABLE 2-continued Road Segment Request Message Time and duration that vehicle requests the road segment and lane
Direction of travel Table 2 therefore shows example fields in a road segment request message.

TABLE 3

Road Segment Clearing Message

Road Segment Clearing Message - V2V message from one vehicle to another
MAP information about what road segment and lane being used
Time and duration that the vehicle will be using the lane
Direction of travel Table 3 therefore shows example fields in a road segment clearing message.

The computing device associated with any network element such as a local traffic service, master traffic service, or traffic management service, as well as a computing device on a vehicle or an RSU, may be any computing device. One simplified diagram of a computing device is shown with regard to FIG. 8.

Figure 8:
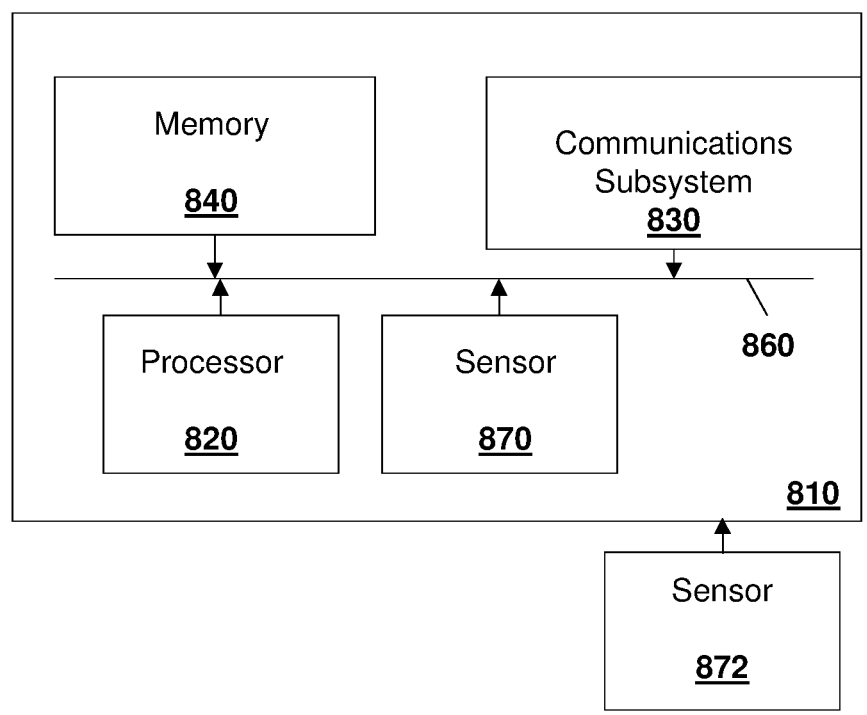
FIG. 8 is a block diagram of a simplified computing device capable of being used with the present embodiments.

In FIG. 8, computing device 810 includes a processor 820 and a communications subsystem 830, where the processor 820 and communications subsystem 830 cooperate to perform the methods of the embodiments described above.

Communications subsystem 830 allows computing device 810 to communicate with other devices or network elements. Communications subsystem 830 may use one or more of a variety of communications types, including but not limited to cellular, satellite, Bluetooth™, Bluetooth™ Low Energy, Wi-Fi, wireless local area network (WLAN), near field communications (NFC), IEEE 802.15, wired connections such as Ethernet or fiber, DSRC, among other options.

As such, a communications subsystem 830 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 830 will be dependent upon the communication network or communication technology on which the computing device is intended to operate.

Communications subsystem 820 may, in some embodiments, comprise multiple subsystems, for example for different radio technologies.

Processor 820 is configured to execute programmable logic, which may be stored, along with data, on device 810, and shown in the example of FIG. 8 as memory 840. Memory 840 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 840, device 810 may access data or programmable logic from an external storage medium, for example through communications subsystem 830.

Communications between the various elements of device 810 may be through an internal bus 860 in one embodiment. However, other forms of communication are possible.

Internal sensors 870 or external sensors 872 may provide data to the computing device 810. Such sensors may include positioning sensors, lidar, radar, image sensors such as cameras, orientation sensors, temperature sensors, vibration sensors, among other options.

The subject matter of the disclosure herein may also relate, among others, to the embodiments of the following clauses:

AA. A method at a computing device in an intelligent transportation system for reconfiguring a road segment, the method comprising: receiving a request from a second computing device associated with a vehicle to change a configuration for the road segment; determining a road segment configuration; and reconfiguring the road segment based on the determined road segment configuration.

BB. The method of clause AA, wherein the computing device is a road segment traffic service, and wherein the request is a request to change a lane direction in the road segment.

CC. The method of clause BB, wherein the reconfiguring is for a time period sufficient for the vehicle to traverse the road segment.

DD The method of clause BB or clause CC, wherein the reconfiguring time period further includes a buffer time to ensure the vehicle has cleared the traffic segment.

EE. The method of any one of clauses BB to DD, wherein the request includes a start time for the reconfiguration.

FF. The method of clause AA, wherein the computing device is a controller and the request includes a route for the vehicle, and wherein the reconfiguring includes reconfiguring a plurality of road segments for the vehicle along the route.

GG. The method of clause AA, wherein the computing device is associated with a second vehicle, and wherein the reconfiguring includes ensuring that the vehicle avoids a road segment when the second vehicle is on the road segment.

HH. The method of any one of clauses AA to GG, wherein the road segment is an intersection, and wherein the reconfiguring includes assigning a plurality of lanes as turn lanes for a set time period.

II. The method of any one of clauses AA to HH, wherein the road segment is an intersection with a plurality of stop signs, and wherein the reconfiguring includes allowing a plurality of vehicles to enter from a first direction before allowing a vehicle to enter from a second direction.

JJ. The method of any one of clauses AA to II, wherein the determining uses intelligent transportation system signaling to find whether any lanes in a road segment are blocked.

KK. A computing device in an intelligent transportation system for reconfiguring a road segment, the computing device comprising: a processor; and a communications subsystem, wherein the computing device is configured to: receive a request from a second computing device associated with a vehicle to change a configuration for the road segment; determine a road segment configuration; and reconfigure the road segment based on the determined road segment configuration.

LL. The computing device of clause KK, wherein the computing device is a road segment traffic service, and wherein the request is a request to change a lane direction in the road segment.

MM. The computing device of clause LL, wherein the computing device is configured to reconfigure for a time period sufficient for the vehicle to traverse the road segment.

NN. The computing device of clause LL or clause MM, wherein the reconfigure time period further includes a buffer time to ensure the vehicle has cleared the traffic segment.

OO. The computing device of any one of clauses LL to NN, wherein the request includes a start time for the reconfiguration.

PP. The computing device of clause KK, wherein the computing device is a controller and the request includes a route for the vehicle, and wherein the reconfiguring includes reconfiguring a plurality of road segments for the vehicle along the route.

QQ. The computing device of clause KK, wherein the computing device is associated with a second vehicle, and wherein the computing device is configured to reconfigure by ensuring that the vehicle avoids entering a road segment when the second vehicle is on the road segment.

RR. The computing device of any one of clauses KK to QQ, wherein the road segment is an intersection, and wherein the computing device is configured to reconfigure by assigning a plurality of lanes as turn lanes for a set time period.

SS. The computing device of any one of clauses KK to RR, wherein the road segment is an intersection with a plurality of stop signs, and wherein the computing device is configured to reconfigure by allowing a plurality of vehicles to enter from a first direction before allowing a vehicle to enter from a second direction.

TT. The computing device of any one of clauses KK to SS, wherein the computing device is configured to determine using intelligent transportation system signaling to find whether any lanes in a road segment are blocked.

UU. A computer readable medium for storing instruction code, which, when executed by a processor of a computing device in an intelligent transportation system for reconfiguring a road segment, cause the computing device to: receive a request from a second computing device associated with a vehicle to change a configuration for the road segment; determine a road segment configuration; and reconfigure the road segment based on the determined road segment configuration.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, distributed, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a controller in an intelligent transportation system, the method comprising:
   receiving at least one message at the controller, the at least one message containing information regarding a location of a vehicle and a destination for the vehicle;
   calculating, at the controller, a route for the vehicle, finding that the route for the vehicle includes reversing a direction of travel for of at least one road segment; and
   sending a communication to one or more vehicles approaching the at least one road segment, through V2X communication, the communication indicating that the direction of travel for the at least one road segment is reversed and a time period during which the direction of travel for the at least one road segment will be reversed, the one or more vehicles being distinct from the vehicle.

2. The method of claim 1, wherein the at least one message received at the controller includes a planned time of travel for the vehicle.

3. The method of claim 1, wherein the method further comprises forwarding the route for the vehicle to the vehicle.

4. The method of claim 1, wherein the calculating the route utilizes a goal selected from at least one of: shortest travel time; shortest distance; or least expensive with regard to tolls.

5. The method of claim 1, wherein the calculating the route includes utilizing routes already planned for other vehicles or congestion rates on road segments as inputs to the calculation.

6. The method of claim 1, wherein the at least one message includes a bid to prioritize the vehicle, and wherein the calculating utilizes the bid when finding the route.

7. The method of claim 1, wherein the controller receives a plurality of messages, and wherein the calculating the route comprises at least one of: optimizing efficiency of roadways; optimizing travel time for vehicles based on a vehicle priority; optimizing revenue for a transportation system; prioritizing messages based on a time each message was received; and prioritizing vehicles based on a time to enter the at least one road segment.

8. The method of claim 1, wherein the controller is collocated with a roadside unit.

9. The method of claim 1, wherein the controller is a network element remote from any roadside unit.

10. A controller in an intelligent transportation system, the controller comprising:
    a processor; and
    a communications subsystem,
    wherein the controller is configured to:
    receive at least one message at the controller, the at least one message containing information regarding a location of a vehicle and a destination for the vehicle;
    calculate a route for the vehicle, find that the route for the vehicle includes reversing a direction of travel for of at least one road segment; and
    send a communication to one or more vehicles approaching the at least one road segment, through V2X communication, the communication indicating that the direction of travel for the at least one road segment is reversed and a time period during which the direction of travel for the at least one road segment will be reversed, the one or more vehicles being distinct from the vehicle.

11. The controller of claim 10, wherein the at least one message received at the controller includes a planned time of travel for the vehicle.

12. The controller of claim 10, wherein the controller is further configured to forward the route for the vehicle to the vehicle.

13. The controller of claim 10, wherein the controller is configured to calculate the route by using a goal selected from at least one of: shortest travel time; shortest distance; or least expensive with regard to tolls.

14. The controller of claim 10, wherein the controller is configured to calculating the route by utilizing routes already planned for other vehicles or congestion rates on road segments as inputs to the calculation.

15. The controller of claim 10, wherein the at least one message includes a bid to prioritize the vehicle, and wherein the calculating utilizes the bid when finding the route.

16. The controller of claim 10, wherein the controller is configured to receive a plurality of messages, and wherein the controller is configured to calculate the route for at least one of: optimizing efficiency of roadways; optimizing travel time for vehicles based on a vehicle priority; optimizing revenue for a transportation system; prioritizing messages based on a time each message was received; and prioritizing vehicles based on a time to enter the at least one road segment.

17. The controller of claim 10, wherein the controller is collocated with a roadside unit.

18. A non-transitory computer readable medium for storing instruction code, which, when executed by a processor of a controller in an intelligent transportation system cause the controller to:
    receive at least one message at the controller, the at least one message containing information regarding a location of a vehicle and a destination for the vehicle;
    calculate a route for the vehicle, find that the route for the vehicle includes reversing a direction of travel for of at least one road segment; and
    send a communication to one or more vehicles approaching the at least one road segment, through V2X communication, the communication indicating that the direction of travel for the at least one road segment is reversed and a time period during which the direction of travel for the at least one road segment will be reversed, the one or more vehicles being distinct from the vehicle.

* * * * *